United States Patent
Gross et al.

(10) Patent No.: US 9,689,700 B1
(45) Date of Patent: Jun. 27, 2017

(54) APPARATUS, SYSTEM AND METHOD FOR GEOMETRIC LINEARIZATION OF NAVIGATIONAL DATA

(71) Applicants: VOLKSWAGEN AKTIENGESELLSCHAFT, Wolfsburg (DE); AUDI AG, Ingolstadt (DE)

(72) Inventors: Benjamin Gross, Braunschweig (DE); Rustan Melville, San Jose, CA (US)

(73) Assignees: VOLKSWAGEN AKTIENGESELLSCHAFT, Wolfsburg (DE); AUDI AG, Ingolstadt (DE)

(*) Notice: Subject to any disclaimer, the term of this patent is extended or adjusted under 35 U.S.C. 154(b) by 0 days.

(21) Appl. No.: 15/074,983

(22) Filed: Mar. 18, 2016

(51) Int. Cl.
    *G01C 21/36* (2006.01)
(52) U.S. Cl.
    CPC ..... *G01C 21/3632* (2013.01); *G01C 21/3682* (2013.01)
(58) Field of Classification Search
    CPC .................. G01C 21/3632; G01C 21/3682
    See application file for complete search history.

(56) References Cited

U.S. PATENT DOCUMENTS

| | | |
|---|---|---|
| 5,583,494 A | 12/1996 | Mizutani et al. |
| 7,130,740 B2 | 10/2006 | Vanegas et al. |
| 7,460,952 B2 | 12/2008 | Ogaki et al. |
| 7,991,548 B2 | 8/2011 | Singh |
| 8,180,568 B2 | 5/2012 | Schmidt |
| 8,577,598 B2 | 11/2013 | Singh |
| 2007/0005241 A1 | 1/2007 | Sumizawa et al. |
| 2011/0054783 A1 | 3/2011 | Kishikawa et al. |
| 2013/0155115 A1 | 6/2013 | Wang et al. |
| 2016/0061620 A1* | 3/2016 | Newlin ............. G01C 21/3676 701/533 |

FOREIGN PATENT DOCUMENTS

| | | |
|---|---|---|
| CN | 101650193 A | 2/2010 |
| DE | 102011102826 A1 | 12/2011 |

OTHER PUBLICATIONS

Kayur Patel, Mike Y. Chen, Ian Smith, & James A. Landay; Personalizing Routes; Proceedings of the ACM Symposium on User Interface Software and Technology; 2006; pp. 187-190.

* cited by examiner

*Primary Examiner* — Michael D Lang
(74) *Attorney, Agent, or Firm* — Loza & Loza, LLP; Peter Zura (57) ABSTRACT

A navigation system, apparatus and method for prioritizing and geometrically linearizing navigational data/content, where internal navigational data having one or more first navigational destinations and/or locations are stored. A global positioning apparatus may be operatively coupled to a processor in the navigation system and configured to determine a current car position (CCP). Communications operatively coupled to the processor may be configured to receive external navigational data comprising one or more second navigational destinations and/or locations, wherein the processor may be configured to prioritize the internal and external navigational data according to at least one of a source and/or type. The processor may also be configured to process the internal and external navigational data to generate a linearized representation of navigational paths for the prioritized first and second navigational destinations and/or locations relative to the CCP.

20 Claims, 11 Drawing Sheets

APPARATUS, SYSTEM AND METHOD FOR GEOMETRIC LINEARIZATION OF NAVIGATIONAL DATA

BACKGROUND

The present disclosure is directed to navigation devices and systems. More specifically, the present disclosure is directed to navigational processing for processing navigational data from one or more sources to geometrically reconfigure and/or transform the navigational data into linear representations.

Navigation systems are electronic, processor-based systems that aid in navigation. Navigation systems may be configured to be entirely on board a vehicle or vessel, or they may be located elsewhere (totally or partially) and communicate via radio or other signals with a vehicle or vessel, or they may use a combination of these methods. Navigation systems may also be configured within a portable device, such as a laptop, smart phone, tablet and the like. Navigation systems may be capable of containing maps, which may be displayed in human readable format via text or in a graphical format, determining a vehicle or vessel's location via sensors, maps, or information from external sources, providing suggested directions to a human in charge of a vehicle or vessel via text or speech, providing directions directly to an autonomous vehicle such as a robotic probe, providing information on nearby vehicles or vessels, or other hazards or obstacles, and providing information on traffic conditions and suggesting alternative directions.

Currently, navigation systems are limited in their ability to collect, process, and display locations that may be common between or among several sources. Furthermore, there are limitations in navigation systems for processing and organizing common destinations in a graphical representation that provides sufficient data and is readily understood by a user. Accordingly, technologies and techniques are needed to collect, process and display location data and to include additional information, such as geometries of routes, traffic flow, traffic incidents and travelling information about the locations.

SUMMARY

Various apparatus, systems and methods are disclosed herein relating to navigation system processing to prioritize internal and external navigational data (content) according to navigational data sources and types, and geometrically processing the navigational data to linearize the navigational map for simplified interpretation by a user.

In some illustrative embodiments, navigation systems are disclosed, comprising a processor; a memory, operatively coupled to the processor, wherein the memory is configured to store internal navigational data comprising one or more first navigational destinations and/or locations; a global positioning apparatus, operatively coupled to the processor and configured to determine a current car position (CCP); and communications operatively coupled to the processor, wherein the communications is configured to receive external navigational data comprising one or more second navigational destinations and/or locations, wherein the processor is configured to prioritize the internal and external navigational data according to at least one of a source and/or type, and wherein the processor is configured to process the internal and external navigational data to generate a linearized representation of navigational paths for the prioritized first and second navigational destinations and/or locations relative to the CCP.

In some illustrative embodiments, methods are disclosed for linearizing navigational data in a navigation system, comprising storing internal navigational data comprising one or more first navigational destinations and/or locations; determining a current car position (CCP) via a global positioning apparatus; receiving, via navigation system communications, external navigational data comprising one or more second navigational destinations and/or locations prioritizing, via the navigation system, the internal and external navigational data according to at least one of a source and/or type; and processing the internal and external navigational data in the navigational system to generate a linearized representation of navigational paths for the prioritized first and second navigational destinations and/or locations relative to the CCP.

In some illustrative embodiments, methods are disclosed for linearizing navigational data in a navigation system, comprising storing internal navigational data comprising one or more first navigational destinations and/or locations; determining a current car position (CCP) via a global positioning apparatus; receiving, via navigation system communications, external navigational data comprising one or more second navigational destinations and/or locations; processing the internal and external navigational data in the navigation system to determine map positions and navigational paths of each of the internal and external navigational data relative to the CCP, wherein at least some of the navigational paths are non-linear; and generating, via the navigation system, a linearized representation of navigational paths for the first and second navigational destinations and/or locations relative to the CCP. The internal and external navigational data may further be prioritized according to at least one of a source and/or type, wherein the linearized representation only includes navigational paths meeting a priority criteria.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Figure 1:
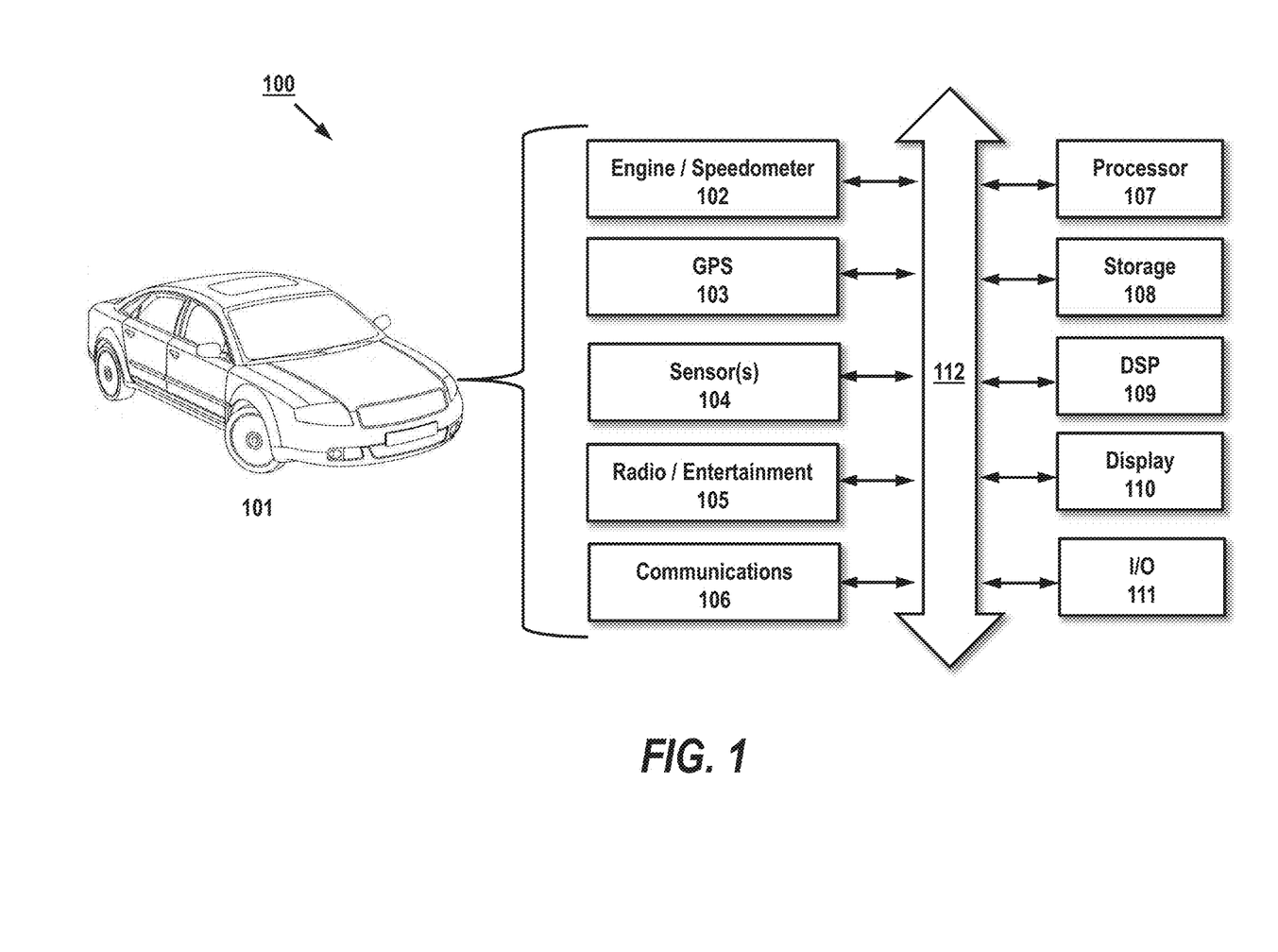
FIG. 1 illustrates an exemplary vehicle system block diagram showing multiple components and modules, together with a navigation system under one embodiment.

Turning to FIG. 1, the drawing illustrates an exemplary system 100 for a vehicle 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) module 103 provides navigation processing (see FIG. 4) and location data for the vehicle 101. The sensors 104 provide sensor data which may comprise data relating to vehicle characteristic and/or parameter data (e.g., from 102), and may also provide environmental data pertaining to the vehicle, its interior and/or surroundings, such as temperature, humidity and the like. Radio/entertainment module 105 may provide data relating to audio/video media being played in vehicle 101. The radio/entertainment module 105 may be integrated and/or communicatively coupled to an entertainment unit configured to play AM/FM radio, satellite radio, compact disks, DVDs, digital media, streaming media and the like. Communications module 106 allows any of the modules of system 100 to communicate with each other and/or external devices (e.g., devices 202-203) via a wired connection or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system 100. Storage 108 may be configured to store data, software, media, files and the like. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. The display 110 may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 2:
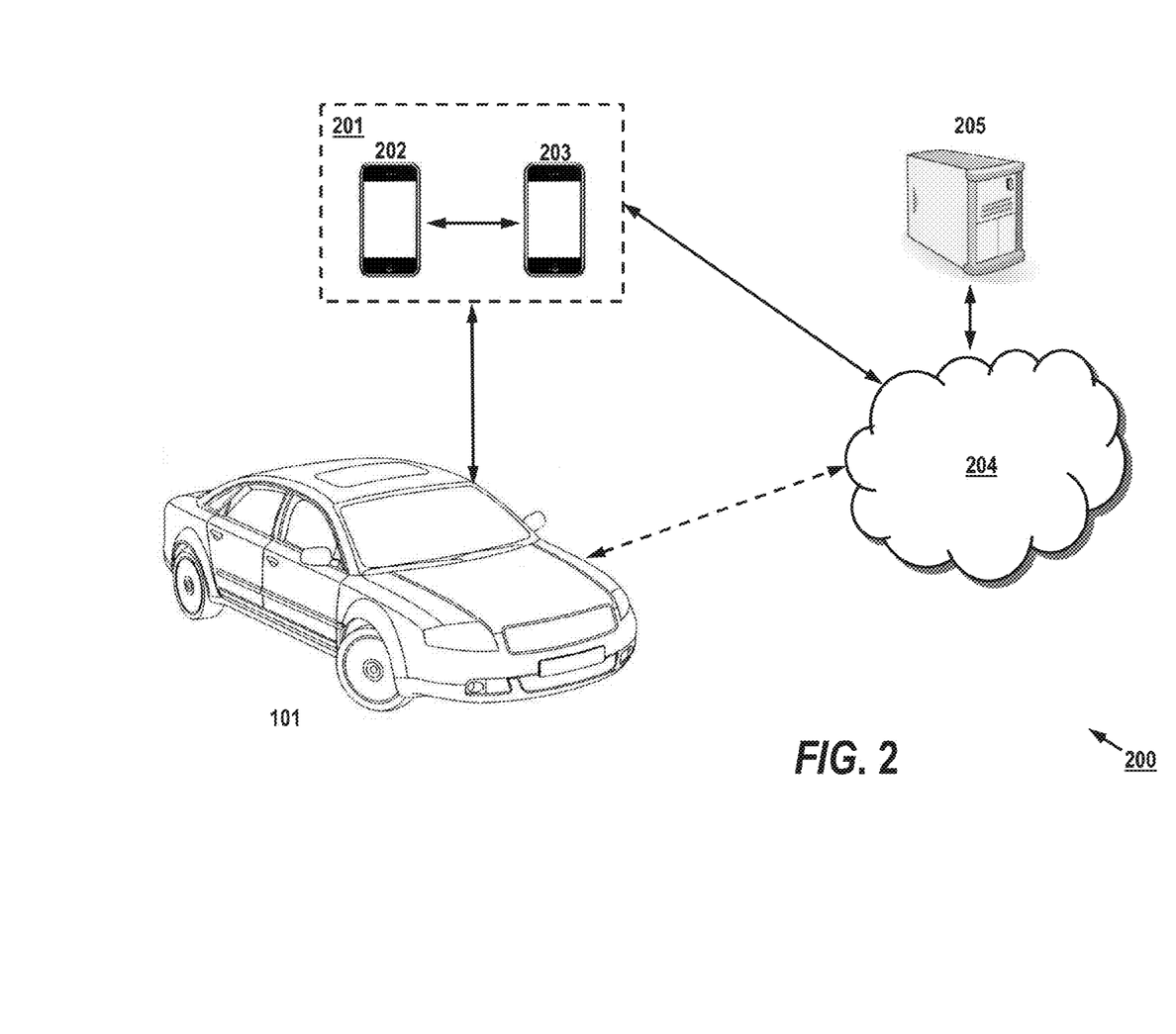
FIG. 2 is an exemplary block diagram illustrating the vehicle of FIG. 1 communicatively coupled to one or more portable devices and a computer network under one embodiment.

Turning to FIG. 2, an exemplary embodiment is illustrated, where a vehicle (e.g., 101), is paired with one or more devices 201 (202, 203) which may be registered to one or more users. Devices 201 may be registered with vehicle 101 using Bluetooth pairing or using WiFi or NFC registration, as is known in the art. Preferably, device 201 registrations are stored (e.g., 108) at the vehicle according to a device ID or SIM ID, and may further include a device user profile associated with each ID that may include demographic data, user interests, and/or user device/vehicle history. In the embodiment of FIG. 2, devices 202, 203 may configured to communicate navigational data with vehicle 101, as well as any other device data including, but not limited to, calendar data, contact data, favorites, applications, etc., and may be further configured to communicate with each other. Portable devices 201 are also configured to communicate with wireless network 204 in order to send/receive data from a central server 205 that may include one or more server. Similarly, in one embodiment, vehicle 101 may also be configured to communicate with network 204. Server 205 may be also configured to perform back-end processing for devices 201 and vehicle 101, and further communicate with other remote servers for additional functionalities, such as supplementary map data, navigational data, and the like.

Figure 3:
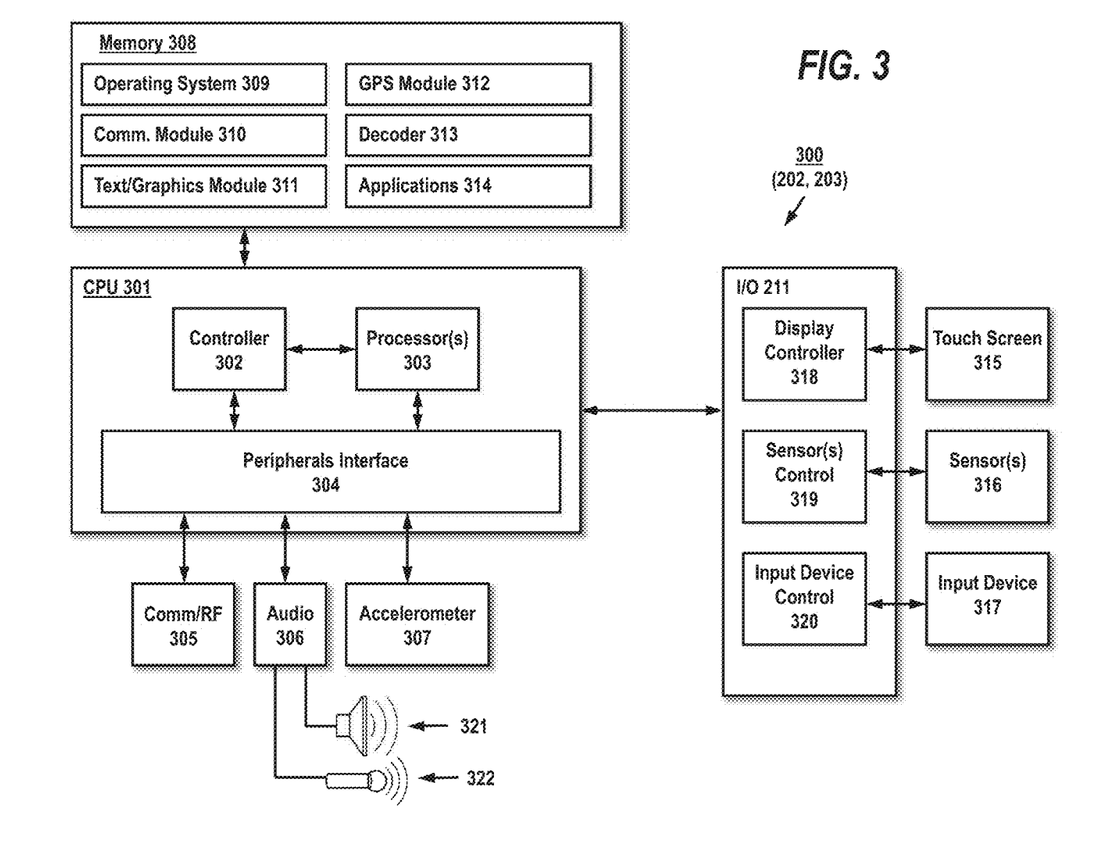
FIG. 3 is an exemplary block diagram illustrating components and modules of a portable device, configured for navigation and navigational processing and further configured to operate with the navigation system in the exemplary system of FIG. 2 under one embodiment.

FIG. 3 is an exemplary embodiment of a portable computing device 300 (such as devices 202, 203 of FIG. 2), and may be a smart phone, tablet computer, laptop or the like. Device 300 may include a central processing unit (CPU) 301 (which may include one or more computer readable storage mediums), a memory controller 302, one or more processors 303, a peripherals interface 304, RF circuitry 305, audio circuitry 306, a speaker 321, a microphone 322, and an input/output (I/O) subsystem 311 having display controller 318, control circuitry for one or more sensors 319 and input device control 320. These components may communicate over one or more communication buses or signal lines in device 300. It should be appreciated that device 300 is only one example of a portable multifunction device 300, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 304, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include encoded audio, described above. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 206 and removable audio input/output peripherals, such as output-only headphones or a headset with both output (e.g., a headphone for one or both ears) and input (e.g., a microphone).

I/O subsystem 311 couples input/output peripherals on the device 300, such as touch screen 315 and other input/control devices 317, to the peripherals interface 304. The I/O subsystem 311 may include a display controller 318 and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 207, which may be operatively coupled to peripherals interface 304. Alternately, the accelerometer 207 may be coupled to an input controller 314 in the I/O subsystem 311. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, audio decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including navigation software, mapping, address books/contact list, email, instant messaging, and the like. Navigation applications may be natively executed and operated on device 300, allowing users to enter and process navigational and/or mapping data, as will be described in greater detail below.

Figure 4:
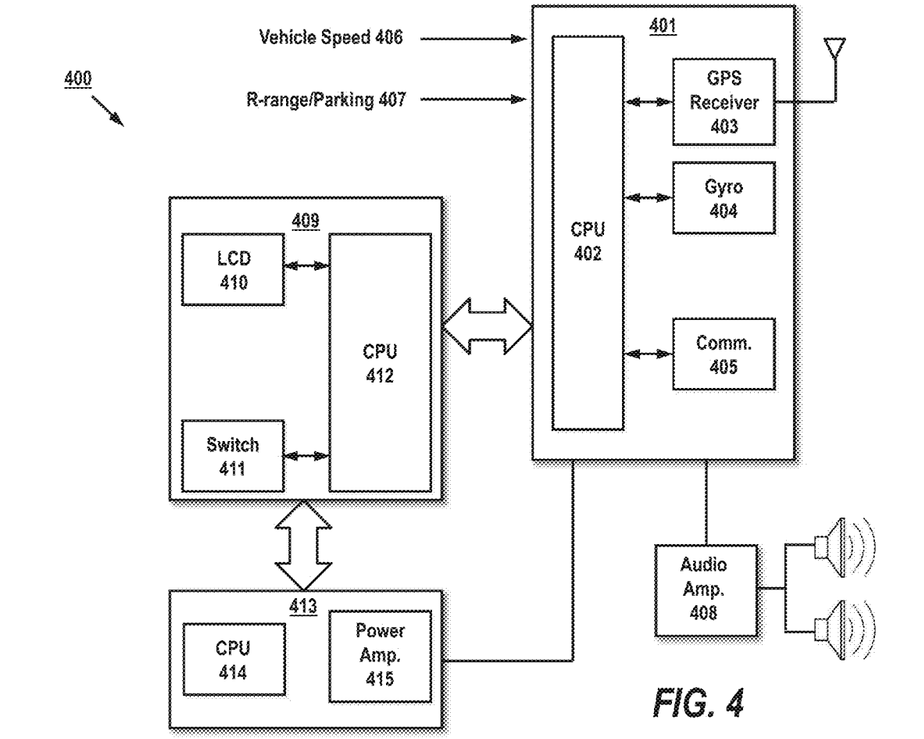
FIG. 4 is an exemplary bock diagram of a vehicle navigation system suitable for use in the exemplary system of FIG. 1 under one embodiment.

Turning now to FIG. 4, an exemplary vehicle navigation system 400 is disclosed comprising a car navigation unit 401 that may include a CPU 402, GPS receiver 403 and gyroscope 404. Additionally, navigation unit 401 may include communications 405, allowing navigation unit 401 to communicate with portable devices, such as device 300, discussed above. In certain illustrative embodiments, navigational data may be received from devices 300 and may be referred to herein as "external navigational content" or "external navigational data." Navigation unit 401 may receive vehicle speed signal 406 and R-range/parking signal 407 to track vehicle movement and status. Navigation unit 401 utilizes GPS receiver 403 to acquire position data to locate the user on a road in the unit's map database. Using a road database, unit 401 can give directions to other locations along roads also in its database. Dead reckoning using distance data from sensors attached to the drivetrain, gyroscope 404 and an accelerometer (not shown) can be used for greater reliability, as GPS signal loss and/or multipath can occur due to urban canyons or tunnels.

The road database for navigation unit 401 may be a vector map containing some area of interest. Street names or numbers and house numbers may be encoded as geographic coordinates so that a user can find some desired destination by street address or, as will be discussed in greater detail below, by a generic or specific name Points of interest (waypoints) may also be stored with their geographic coordinates. Point of interest specialties may include speed cameras, fuel stations, public parking, and so forth. Contents can be produced by the user base as a vehicle drive along existing streets (cellular, Wi-Fi) and communicating via the internet, yielding an up-to-date map. Navigation mapping formats may include geographic data files (GDF), and may also include other formats, such as CARiN, SDAL and NDS PSF. Navigational content contained within navigation unit 401 may be referred to herein as "internal navigational content" or "internal navigational data".

Navigation unit 401 may be further coupled to LCD unit 409 and audio unit 413, where LCD unit 409 may comprise LCD screen 410, CPU 412 and on/off switch 411. Audio unit 413 may comprise CPU 414 and power amplifier 415. Output of audio unit 413 may be forwarded to audio amplifier 408 for output to a user.

During operation, the embodiments of FIGS. 1-4 may be configured to collect internal and external navigational content (e.g., favorites, locations, contacts, addresses, etc.), process the navigational content and display a number of common locations from several sources. The sources include, but are not limited to, a navigation system (e.g., 400), a user device (e.g., 300), and/or a network server (e.g., 205). In one example, the navigation system (e.g., 400, 103) may process and geometrically organize the common destinations in a graphical representation. The graphical representations may include additional information such as the geometry of the route, traffic flow, traffic incidents and travelling information about the locations.

Figure 5:
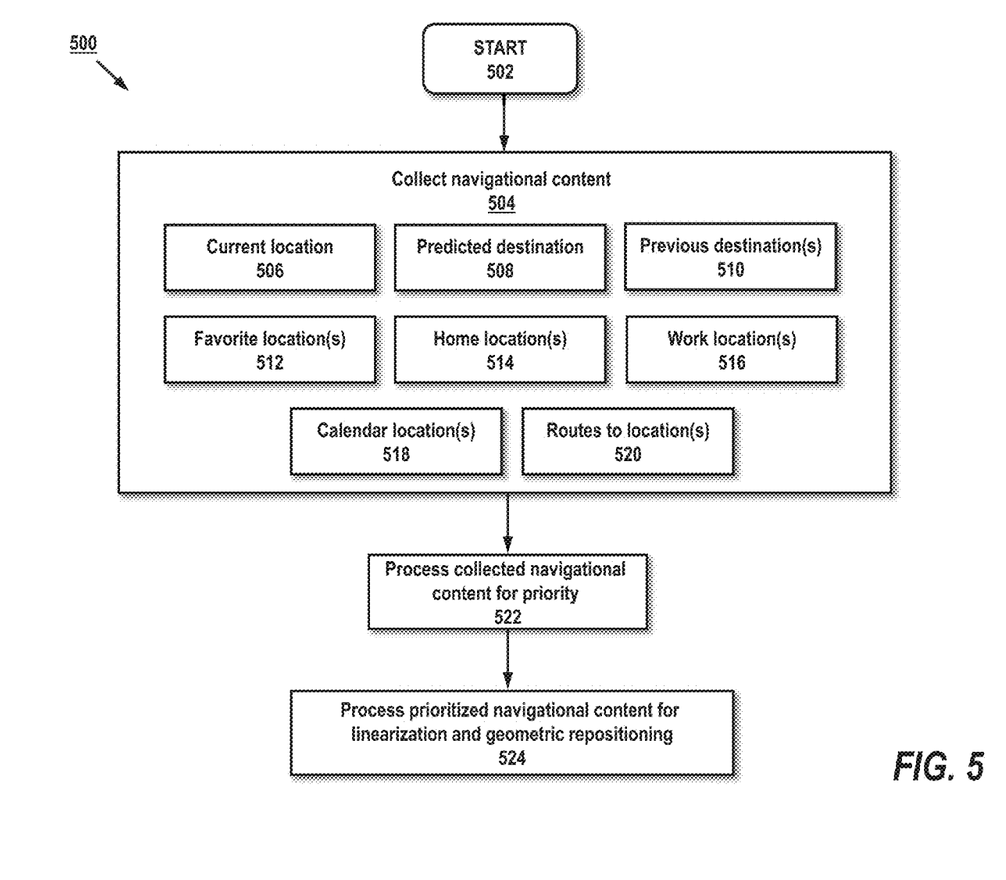
FIG. 5 shows a flow diagram for collecting navigational content from any single or combination of a plurality of sources using any of the embodiments of FIGS. 1-3, wherein the collected navigational content is subjected to prioritization processing and display processing under an illustrative embodiment.

Turning to FIG. 5, an illustrative process 500 is shown where a navigation system (e.g., 400, 103) is configured to collect navigational content from multiple sources, process and prioritize the collected navigational content, and perform linearization and geometric repositioning processing for display on the navigation system. The process 500 may begin at start block 502, where the navigation system collects navigational content in block 504. As mentioned above, the navigational content may be collected/received from a plurality of sources including, but not limited to, cell phones, tablets, laptops, personal computers, servers, and/or a computer network (e.g., cloud-based system and/or service). The navigational content may be received using any conventional communication platform, including, but not limited to, Bluetooth™, Wi-Fi, Ethernet, cellular communication and the like.

The navigational content, depending on the source, may comprise various navigational content data including a current location 506, one or more predicted destinations 508, one or more previous destinations 510, one or more favorite locations 512, a home location 514, one or more work locations 516, one or more calendar locations 518 (e.g., locations derived by a calendar application) and/or one or more routes to locations 520. In block 520, the routes to locations may include further navigational data, including, but not limited to, predicted routes for predicted destinations, fastest routes for other locations, physical segments for routes, major street names, major road numbers, traffic flow and traffic incidents. It should be understood by those skilled in the art that other kinds of navigational content, such as geotags and social media geographic content are contemplated by the present disclosure.

Once the navigational content is collected/received in block 504, the navigation system may process the collected navigational content for priority in block 522, which is explained in further detail in connection with FIG. 6. Once prioritized, the navigation system may process the prioritized navigational content for linearization and geometric repositioning in block 524, which is explained in further detail below in FIGS. 7-10.

Figure 6:
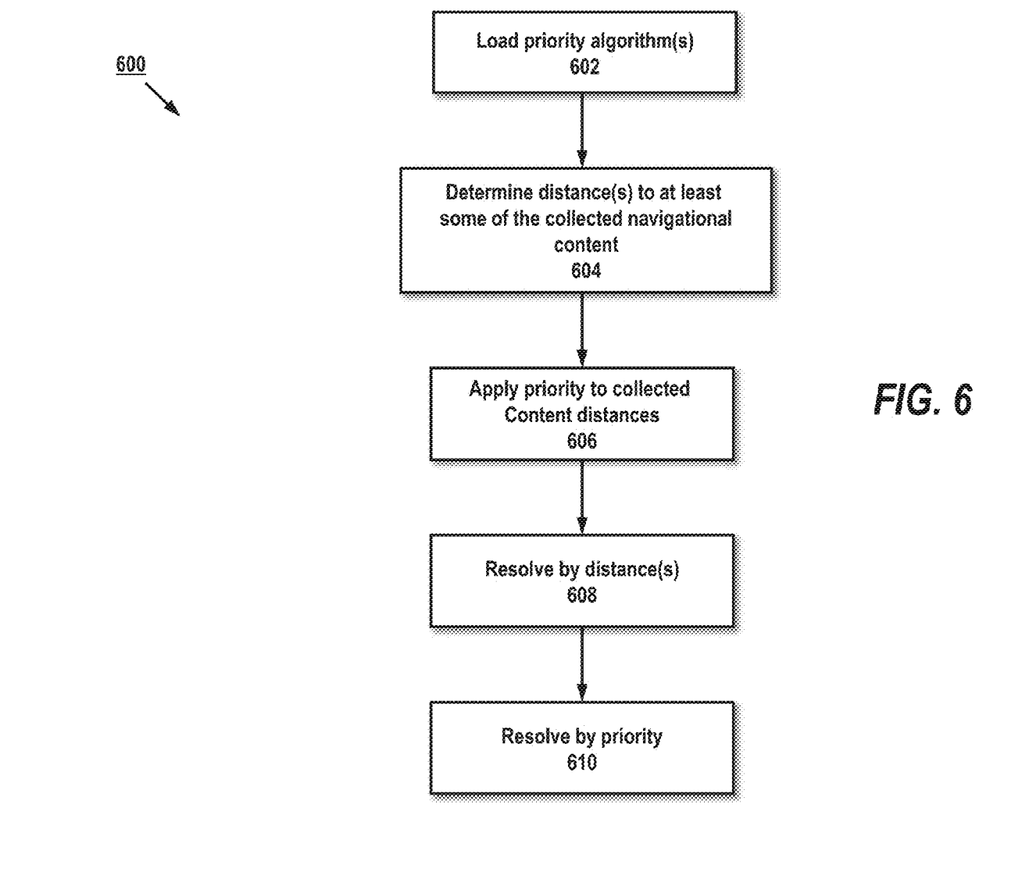
FIG. 6 shows a flow diagram for navigational content data priority processing and resolution for navigational content data using any of the configurations of FIGS. 1-3 under an illustrative embodiment.

Turning to FIG. 6, an illustrative process 600 is shown for prioritizing navigational data for processing and display, where, in block 602, a priority algorithm may be loaded into the navigation system (e.g., 400, 103). Under one illustrative embodiment, multiple prioritization algorithms may be stored and loaded, similar to a navigational profile to a user, or group of users, where a specific priority algorithm may be selected (e.g., via touch screen on a navigation system or portable device) and loaded into the navigation system. The prioritization algorithm of block 602 may include a predetermined priority based on a navigational data type. A navigational data type may be defined by a type and/or source of the navigational data. In certain illustrative embodiments, predetermined priorities may be assigned to a type and/or source of collected navigational data. In one example, a tiered priority ranking may be assigned as follows:

Priority 1: Location received from portable device
Priority 2: Locations derived from calendar
Priority 3: Home location
Priority 4: Predicted destinations
Priority 5: Work location
Priority 6: Last used location saved as Favorite
Priority 7: Last used location from Last Destinations
Priority 8: Remaining Favorites
Priority 9: Remaining Destinations.

In one example, the navigation system may be configured such that locations derived from a calendar application ("Priority 2") are processed to order locations based on a destination time required for each location. In certain illustrative embodiments, a constant or variable time buffer may be added to prioritize the location. For example, a calendar entry having a derivable location or address may be received in the navigation system. The navigation system processor (e.g., 402) may calculate the real-time traffic time (RTT) for arriving at the location and determine is sufficient time is available to arrive at the location. In one example a time buffer (e.g., 1 hour) may be added to the estimated time of arrival to ensure that the time of arrival is within the buffered time period (e.g., arriving at least 1 hour before the required time of arrival).

In one illustrative example, once the priority algorithm is loaded in block 602, the executed priority algorithm may determine one or more distances to at least some of the locations in the collected navigational content in block 604. In one example, the distances may be calculated from a current car position (CCP) to each location of the navigational data based on navigational paths. In another example, distances may be calculated from a CCP to multiple locations determined to be part of a common navigational path.

In block 606, the navigation system applies priorities to the collected content distances and resolves the data by distance(s) in block 608 and resolve the data by priority in block 610. The resolution processes depicted in blocks 608 and/or 610 may be performed independently or simultaneously in the navigation system, wherein the resolution determines navigational content, navigational locations, destinations and paths meeting a prioritization criteria, discussed in greater detail below. In block 608, distances may be calculated relative to a current location, and/or one or more destinations. Each distance may also be processed against distances to other destinations to determine relative distances (e.g., distance A being 10% longer relative to distance B and 30% shorter relative to distance C). This resolution advantageously allows for relative prioritized display and navigation that may be configured in a logical (e.g., Boolean) arrangement.

In a simplified example, if a distance (D1) from one source (User1's phone having priority P1) is equal to the distance (D2) from another source (User2's phone having priority P2, the system may be configured such that only the location from the higher priority (User1, or P1) will be displayed on the navigational map. Displayed locations may be limited to a predetermined radius (e.g., 10 miles, 400 meters, etc.) around the CCP (e.g., air distance). In another simplified example, for given distances (D1, D2, D3) and priorities (P1, P2), the following display and navigational logic may be constructed:

$$\text{IF } D1 \leq (D2 + [0.1*(D1)]) \text{ THEN } P1 = P1 - 1 \quad (1)$$

$$\text{IF } D1 \geq D3 \text{ THEN } P1 = P1 + 1 \quad (2)$$

$$\text{IF } D1 < D2 \text{ and } P1 > P2 \text{ then } P1 = P1 - 1 \quad (3)$$

Here, in equation (1), if a first distance (D1) is less than or equal to the sum of a second distance (D2) plus 10% of the first distance (0.1*(D1)), then the priority of P1 is increased by one (P1−1). In equation (2), if a first distance (D1) is greater than or equal to another distance (D3), then the priority of P1 is decreased by one (P1+1). In equation (3), if distance D1 is less than distance D2, and the priority of P1 is greater than priority P2, then the priority of P1 is increased by 1 (P1−1). It should be understood by those skilled in the art that equations (1)-(3) may be applied individually or in one or more combinations with each other. Of course, there are a multitude of other logical navigational configurations that may be constructed under the present disclosure.

Figure 7:
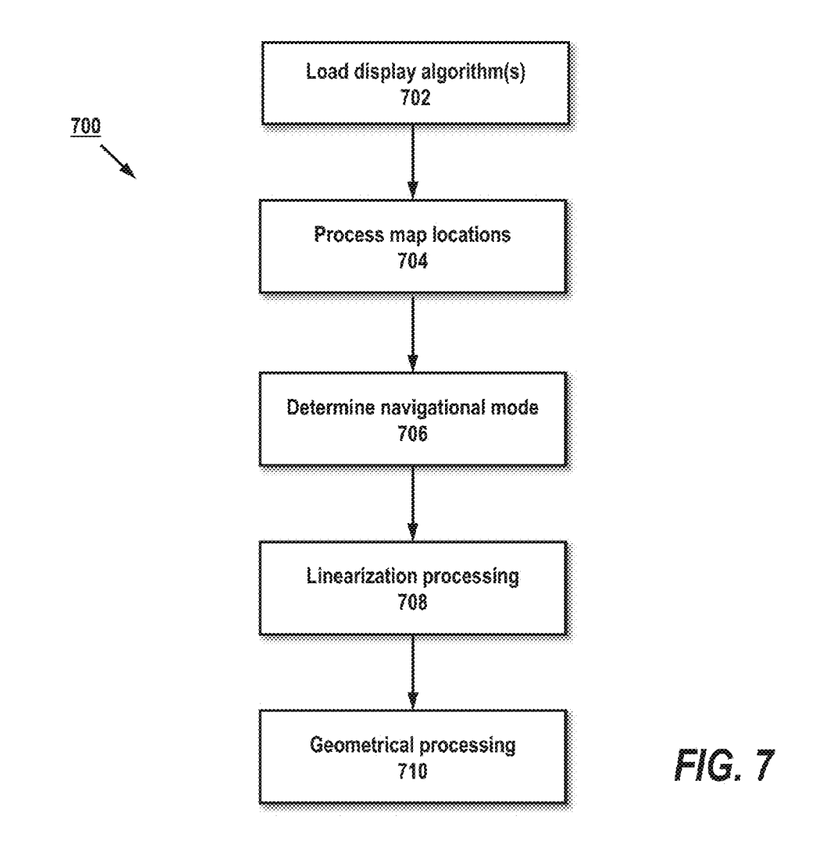
FIG. 7 shows a flow diagram for navigational content data processing for linearization and geometric processing using any of the configurations of FIGS. 1-3 under an illustrative embodiment.

Turning to FIG. 7, a process 700 is shown for linearization and geometric processing of navigational content data using any of the systems and/or apparatuses of FIGS. 1-3 under an illustrative embodiment. In block 702, the navigational system loads one or more display algorithms. The navigational system may comprise multiple display algorithms that may be called after prioritization processing of FIG. 6 is performed. Under certain illustrative embodiments, display algorithms may be incorporated into the prioritization processing 600 and be performed concurrently with prioritization. The loaded display algorithm may be dependent upon the prioritization calculations/values generated in 600, or may be partially or completely independent therefrom.

In block 704, the process 700 processes map locations to determine map positions or locations and/or navigational paths relative to a CCP and determines/establishes one or more navigational modes in block 706 for the map locations. The navigational modes may include, but are not limited to, fastest route, shortest distance, and so on. In block 708, the navigation system performs linearization processing to recreate the navigational map as a linear depiction among the CCP and one or more map locations. In block 710, the navigation system performs geometrical processing to position and display the linearized map locations relative to a CCP.

Figure 8A:
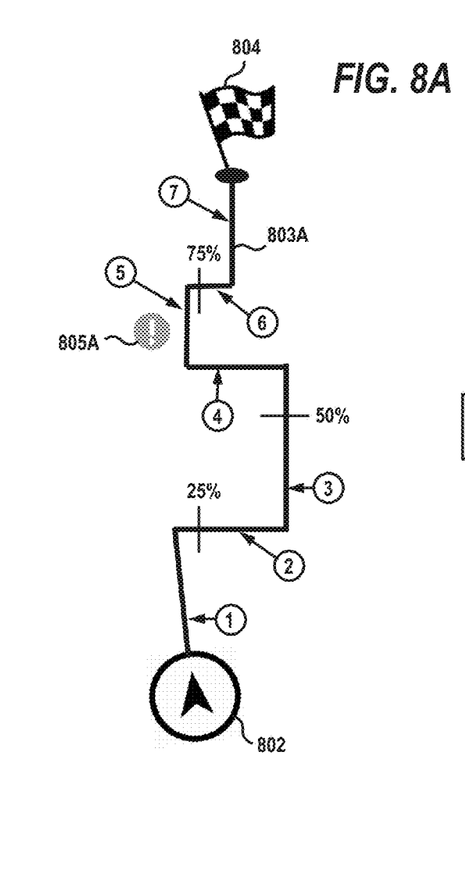
FIG. 8A shows a simplified navigational route comprising a meandering path from a point of origin to a destination point.
Figure 8B:
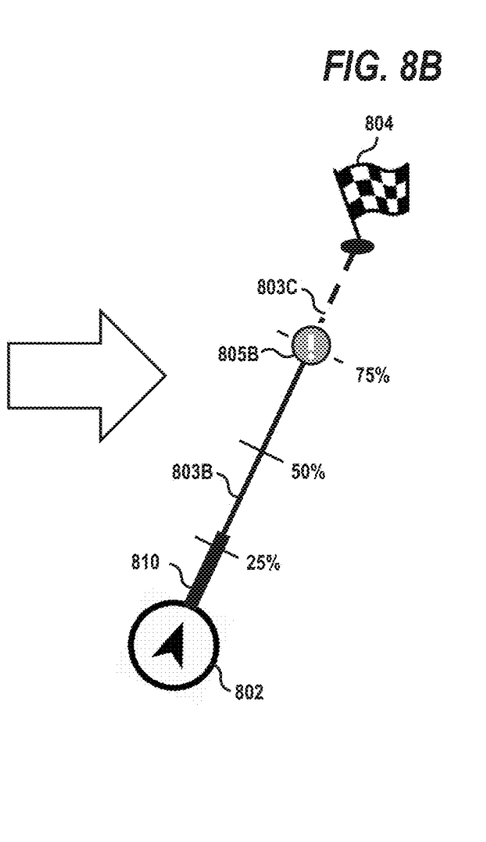
FIG. 8B shows a linearized representation of the meandering path of FIG. 8A subjected to linearization and other processing using any of the configurations of FIGS. 1-3 under an illustrative embodiment.

FIGS. 8A-8B show a simplified example of linearization processing under an illustrative embodiment. In FIG. 8A, a navigational path 803A is shown from a CCP 802 to a destination 804, wherein the navigational path 803A comprising a plurality of navigational segments (1-7), at least some of which are nonlinear relative to each other. It should be understood by those skilled in the art that the navigational segments may be straight or curved navigational lines, and may be perpendicular, parallel, orthogonal and/or oblique relative to each other. In certain illustrative embodiments, the navigation system may calculate a navigational path (e.g., 803A) for each destination/location identified from the collected navigational content. In some illustrative embodiments, the navigation system may calculate navigational paths only for destinations/locations meeting priority criteria calculated in the process 600 of FIG. 6. The navigational paths may be calculated using a universal navigational setting for all paths (e.g., fastest route, shortest distance, etc.), or calculating paths according to a predetermined setting or user preference for each path, which may be different among the routes.

During the calculation of the navigational path 803A, the navigational system may also process and/or calculate additional information regarding the route. In an illustrative embodiment, navigational path progress markers (e.g., 25%, 50%, 75%) may be calculated for the navigational route 803A. Additionally, route and/or traffic related information and alerts (e.g., 805A) may be processed for presentation on the navigation system.

Using linearization processing (e.g., 708 of FIG. 7), the navigation system may transform the navigational path 803A as a fully linear representation as shown in FIG. 8B. In this example, the plurality of navigational segments of navigational path 803A are transformed to a linear representation illustrated collectively by segments 803B and 803C. In addition, route and/or traffic information and alerts 805B may be represented on the linearized representation to indicate one or more relative areas on the navigational path(s) where route and/or traffic information may be relevant. Linearized segments 803B and 803C are shown as differently visualized segments, where segment 803B may be represented as a solid line, while segment 803C may be represented as a dotted line, representing that traffic flow through linearized segment 803B is normal, while traffic may be congested on linearized segment 803C due to a traffic incident at location 805B. It should be understood by those skilled in the art that linearized traffic segments may be graphically depicted using different line styles, such as solid, dotted, dashed, dot-dashed, double lines, and so forth, and may be visualized using a variety of line thicknesses and colors (e.g., red, yellow, green). In certain illustrated embodiments, a navigational progress bar 810 is provided to indicate to a user how far along a navigational path a vehicle has traveled.

In certain illustrative embodiments, the linearization process may be executed by summing the distances of the navigational path segments (e.g., 1-7) in the navigational system and transforming the distance to a linear representation. In one example, the linear representations may be multiplied by a scaling factor (e.g., between 0.1 and 3) to present one or more linearized paths within the confines of a navigational system display screen, while maintaining the relative linearized distances constant among the paths. Under such a configuration, linearized paths may be extended or shortened uniformly. Multiple linearized paths may be processed and presented in a number of formats, including, but not limited to, a horizontal bar map (or "graph"), a vertical bar map (or "graph") and a radial map (or "graph"). In certain illustrative embodiments, a horizontal bar map may separately show each linearized navigational path (e.g., FIG. 8B) as a horizontal path, while a vertical bar map may separately show each linearized navigational path (e.g., FIG. 8B) as a vertical path. The order of the linearized paths may be displayed according to length and/or priority, or some other suitable metric (e.g., ETA).

Figure 9:
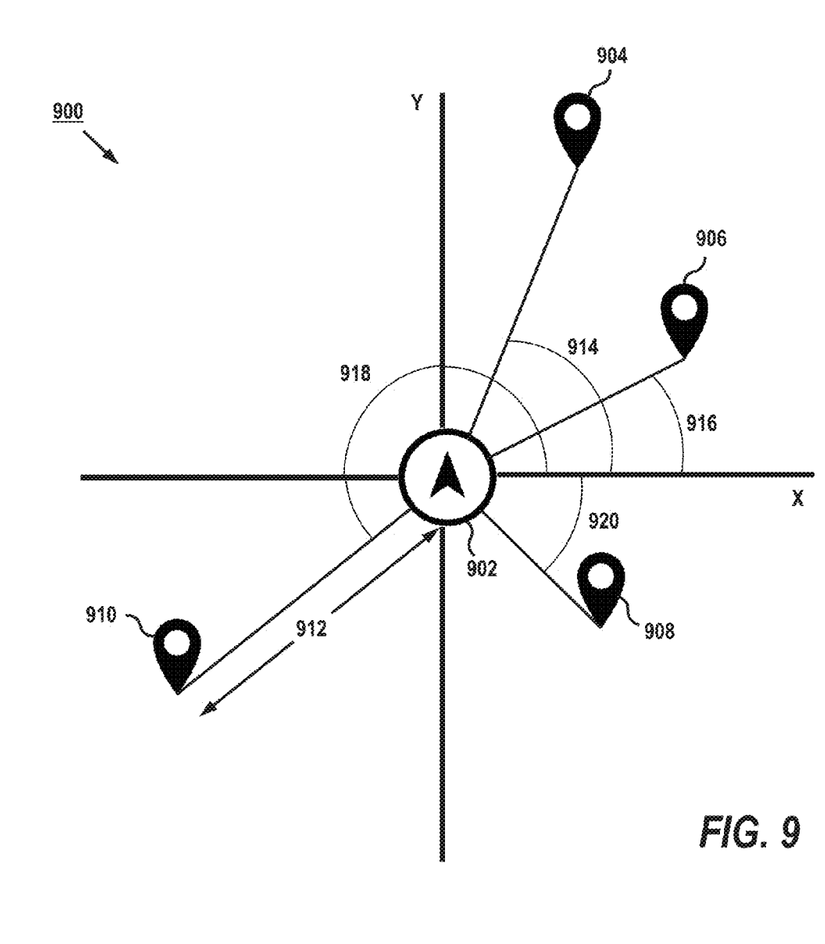
FIG. 9 shows a graphical representation of navigational content data subjected to geometrical processing under an illustrative embodiment.

Turning to FIG. 9, a radial map representation format of linearized paths is shown under an illustrative embodiment, wherein a plurality of destinations/locations 904-910 are shown having linearized paths (e.g., 912) relative to a CCP of a vehicle 902 that may serve as a center point of an imaginary X-Y axis for the graphical representation. Each of the plurality of destinations/locations 904-910 may be positioned on the linearized navigational map 900 based on their location on the (non-linearized) map. As the linearization does not require an exact one-to-one correlation with the map in certain illustrative embodiment, the destinations/locations 904-910 map placement may be estimated based on a general navigation location and/or a pixel placement on a navigational map.

In the radial map representation 900, each destination/location may be processed to determine a radial angle (914-920) relative to an axis (e.g., the X axis) upon which the CCP is centered. The angle may be calculated from a counter-clockwise direction along the axes (e.g., 914-918) and/or a clockwise direction (e.g., 920). In the event two or more destinations/locations coincide or overlap on a given point, an offset algorithm may be applied to distance the destinations/locations away from each other in a radial direction to differentiate between the points. Under one example, if two destinations/locations coincide over the same point, each destination/location may be offset 5 degrees radially from each other. During use, a navigation system processes and re-orients various navigational icons, such as a vehicle CCP and destinations/locations, such that collected navigation data, which may include only a user's preferred destinations/locations, may be presented to a user in a manner that advantageously provides a universal display Turning to FIG. 10, a simulated navigation system display screen 1000 is shown under an illustrative embodiment. In this example, the navigation system collects navigation data and performs the processing techniques described above in connection with FIGS. 5-9. When displaying the collected navigation data, a vehicle CCP 1002 is shown, along with destination/locations 1004, 1008, 1012 and 1016, each having a predetermined icon representing the destination/location at an actual or estimated map position. In certain illustrative embodiments, each destination/location may additionally include an informational data segment (1006, 1010, 1014, 1018) providing information regarding the destination/location. Informational data segments may also provide indicia of priority of each destination/location (e.g., 1, 2, 3, etc.) and/or may indicate a current navigational path (e.g., highlighting a segment 1006). Similar to the embodiment of FIG. 8B, alerts (e.g., 1022, 1032) may be provided and linearized navigation paths may be displayed using different line styles or colors. In this example, solid lines (e.g., 1020, 1030, 1040) may indicate normal traffic and dotted lines (e.g., 1024, 1034) may indicate navigational paths experiencing traffic issues.

Figure 10:
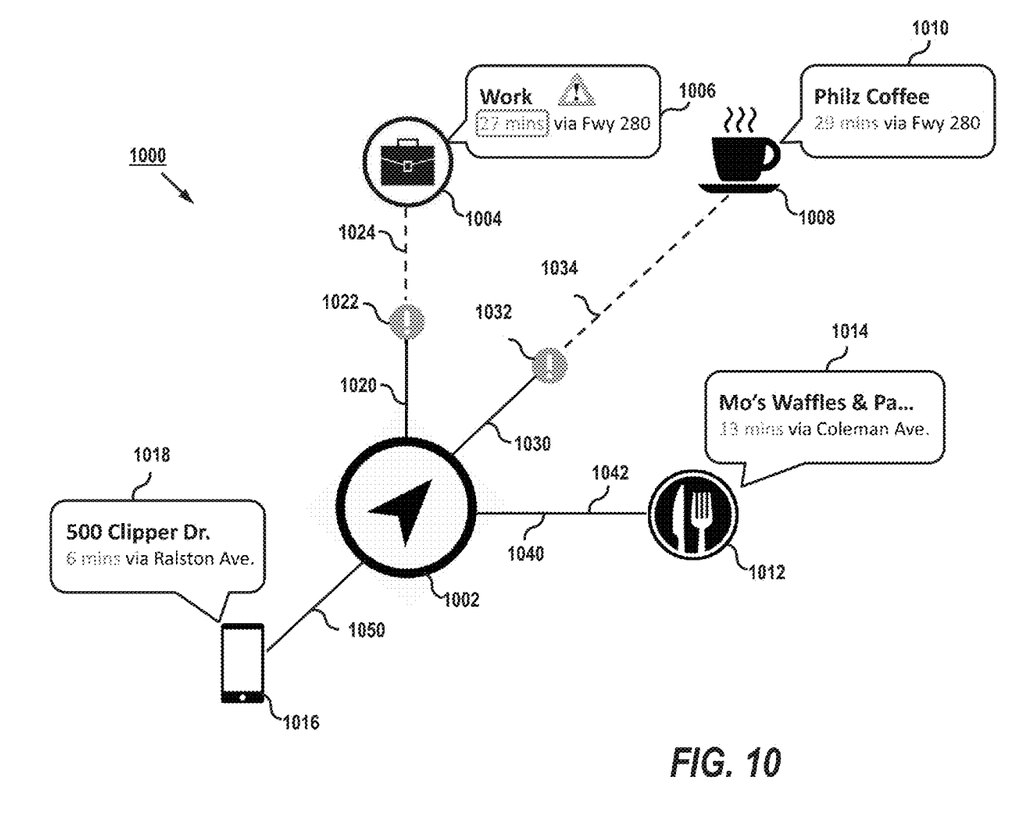
FIG. 10 shows an example of a navigational display of processed navigational content data subjected to linearization and geometric processing under an illustrative embodiment.
Figure 11:
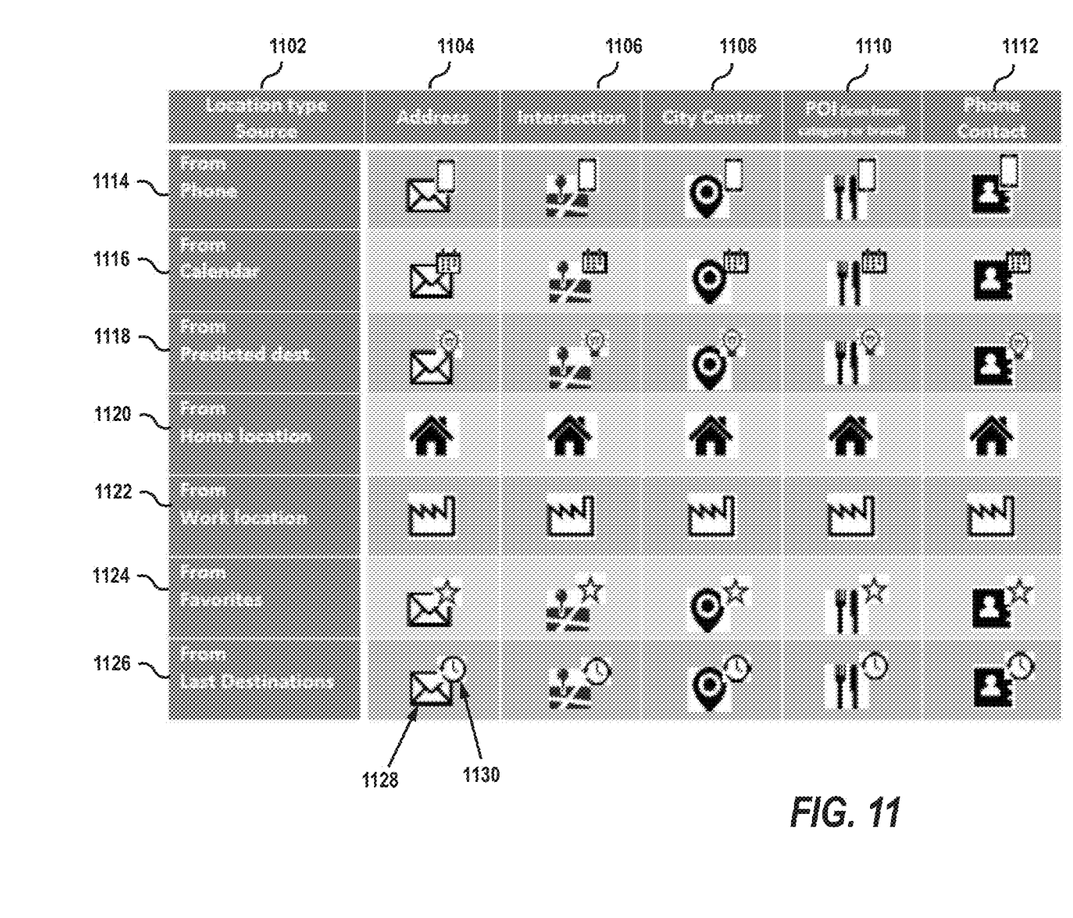
FIG. 11 shows a data table for formatting navigational icons and/or text for navigation systems utilizing and of the techniques described in FIGS. 1-10 under an illustrative embodiment.

FIG. 11 shows a data table 1100 for formatting navigational icons and/or text for navigation systems utilizing and of the techniques described in FIGS. 1-10 under an illustrative embodiment. In certain illustrative embodiments, the data table 1100 may be formed from collected navigational content that may originate from multiple types and sources 1102, including, but not limited to, a user phone 1114, a calendar application 1116, predicted destinations 118, home location 1120, work location 1122, user favorites 1124 and previous/last destinations 1126. Collected navigational content types may include, but are not limited to, addresses 1104, intersections 1106, city center 1108, points of interest 1110, and phone contacts 1112. Each icon may comprise an icon indicating a navigational content type (e.g., 1128) and a source (e.g., 1130) that may be displayed on the navigational screen (e.g., 1000).

It should be understood by those skilled in the art that the present disclosure provides a flexible and efficient platform for determining navigational content that is most pertinent to a user and transforming/displaying the navigational paths relating to that content in an easy-to understand format. Of course, many modifications and alterations are contemplated in the present disclosure. In certain illustrative embodiments, locations are organized and presented in a graphical representation that simplifies the actual geometry of the map. For each shown location the fastest route may be calculated. If the location is a predicted destination, the predicted route may be used for the graph. If the calculated fastest route for the predicted destination is faster than the predicted route, the system may indicate this with an icon (e.g., 1004, 1006, 1022) showing "Faster route available." If a location is not a predicted destination, a fastest route may be used for the graph. On the shown routes the information relating to traffic flow and traffic incidents may be presented under certain illustrative embodiments. For each location, the following illustrative, and non-limiting, information may be presented under certain embodiments:

An icon (e.g., formatted as illustrated in FIGS. 10-11);
A name (e.g., formatted as illustrated in FIGS. 10-11);
An estimated time of arrival (ETA), formatted (e.g., color, line style) based on an average traffic influence;
Via point information; and/or
Linearized geometry of locations and routes, transformed into a linear and/or radial representation of each route.

As disclosed above, each location and the corresponding route may be visualized using a one-dimensional representation. The number of locations that each visualization can include may depend on the parameters of the displaying device (e.g., size of viewport, aspect ratio, size of icons and text). In certain illustrative embodiments, the icons of the locations and the corresponding text/graphical information may be processed and displayed based on the following non-limiting illustrative algorithm, which may be performed in order of the steps described, or in another order, depending on the application:

Receive and process navigational content (e.g., FIG. 5) including a number of destinations/locations;
Determine the priorities of each location (FIG. 6);
Determine angles of each location in relation to the CCP (FIGS. 7, 9);
Determine location sources of any/each location from prioritized sources:
a. From phone;
b. From calendar;
c. From predicted destinations (e.g., from Precise Differential GPS Navigation (PNav) module);
d. From home location;
e. From work location;
f. From Favorites; and/or
g. From Last Destinations.
Determine the location type for each location from any one or more of:
a. Address;
b. Intersection;
c. Point(s) of interest (POI), with or without category/brand;
d. Geo-position;
e. City center; and/or
f. Phone contact.
Determine meta information for each location including one or more of:
a. Location name;
b. ETA/Travel time;
c. Via name (e.g. "Fwy 280", "A39", "Lehre", "Leipzig"); and
d. Aggregated traffic indicator (free flow, medium flow, heavy flow, stationary, unknown flow).
Determine traffic flow for the route to the location based on a traffic flow percentage, such as
0-12%, indicating heavy flow
12-27%, indicating moderate flow
27-31%, indicating light flow
31-98%, indicating free flow
98-100%, indicating open or unknown flow
Determine traffic incidents and alerts for the route to each location that include the following information:
a. Position on the route in percentage
b. Priority in relation to the other incidents on the same route
c. Type of incident As discussed above, linearized routes may be displayed from a CCP to each location. Each point of the original route may be mapped to the same point on the straight line based on a scale or percentage. Routes of different length may be visualized according to different scales, because the ultimate length of the straight line to each location may be constant. In this manner, the traffic flows and traffic incidents may also be mapped on the route. In case two or more traffic incidents collide, an offset algorithm may be applied to distance the incident icons along the linearized route. Alternately, only the incident icon with the highest priority may be displayed.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A navigation system, comprising:
a processor;
a memory, operatively coupled to the processor, wherein the memory is configured to store internal navigational data from an internal navigational data source within the navigation system, the internal navigational data comprising one or more first navigational destinations and/or locations;

a global positioning apparatus, operatively coupled to the processor and configured to determine a current car position (CCP); and communications operatively coupled to the processor, wherein the communications is configured to receive external navigational data from an external navigational data source, the external navigational data comprising one or more second navigational destinations and/or locations wherein the processor is configured to automatically prioritize the internal and external navigational data according to a source and type, and wherein the processor is configured to process the internal and external navigational data to generate a linearized representation of navigational paths for the prioritized first and second navigational destinations and/or locations relative to the CCP.

2. The navigation system of claim 1, wherein the processor is configured to generate the linearized representation by transforming nonlinear navigational segments of each navigational path into a linearized representation.

3. The navigation system of claim 2, wherein the linearized representation comprises one of a linearized horizontal map, a linearized vertical map and a radial map.

4. The navigation system of claim 1 wherein the processor is configured to position the linearized first and second navigational destinations and/or locations geometrically relative to a map position.

5. The navigation system of claim 1, wherein the processor is configured to assign a priority to each of the at least one of a source and/or a type of internal and external navigational data and prioritize the internal and external navigational data via the priority.

6. The navigation system of claim 5, wherein the processor is configured to prioritize the internal and external navigational data utilizing distances of each of the first and second navigational destinations and/or locations relative to the CCP.

7. The navigation system of claim 5, wherein the source of navigational data comprises at least one of a phone, a calendar, a predicted destination, a home location, a work location, a favorite location and a previous destination.

8. The navigation system of claim 5, wherein the type of navigational data comprises at least one of an address, an intersection, a point of interest, a geo-position, a city center and a phone contact.

9. The navigation system of claim 1, wherein the processor is configured to provide meta information for at least one of the prioritized first and second navigational destinations and/or locations.

10. A method for linearizing navigational data in a navigation system, comprising:

storing internal navigational data from an internal navigational data source within the navigation system, the internal navigational data comprising one or more first navigational destinations and/or locations;

determining a current car position (CCP) via a global positioning apparatus;

receiving, via navigation system communications, external navigational data from an external navigational data source, the external navigational data comprising one or more second navigational destinations and/or locations automatically prioritizing, via the navigation system, the internal and external navigational data according to a source and type; and processing the internal and external navigational data in the navigation system to generate a linearized representation of navigational paths for the prioritized first and second navigational destinations and/or locations relative to the CCP.

11. The method of claim 10, wherein generating the linearized representation comprises transforming nonlinear navigational segments of each navigational path into a linearized representation.

12. The method of claim 11, wherein the linearized representation comprises one of a linearized horizontal map, a linearized vertical map and a radial map.

13. The method of claim 10, further comprising positioning, via the navigation system, the linearized first and second navigational destinations and/or locations relative to a map position.

14. The method of claim 10, further comprising assigning a priority, via the navigation system, to each of the at least one of a source and/or a type of internal and external navigational data and prioritizing the internal and external navigational data via the priority.

15. The method of claim 14, wherein prioritizing the internal and external navigational data comprises prioritizing distances of each of the first and second navigational destinations and/or locations relative to the CCP.

16. The method of claim 14, wherein the source of navigational data comprises at least one of a phone, a calendar, a predicted destination, a home location, a work location, a favorite location and a previous destination.

17. The method of claim 14, wherein the type of navigational data comprises at least one of an address, an intersection, a point of interest, a geo-position, a city center and a phone contact.

18. The method of claim 10, further comprises providing meta information for at least one of the prioritized first and second navigational destinations and/or locations.

19. A method for linearizing navigational data in a navigation system, comprising:

storing internal navigational data comprising one or more first navigational destinations and/or locations;

determining a current car position (CCP) via a global positioning apparatus; and receiving, via navigation system communications, external navigational data comprising one or more second navigational destinations and/or locations;

processing the internal and external navigational data in the navigation system to determine map positions and navigational paths of each of the internal and external navigational data relative to the CCP, wherein at least some of the navigational paths are non-linear; and generating, via the navigation system, a linearized representation of navigational paths for the first and second navigational destinations and/or locations, wherein each linearized representation is displayed geometrically relative to a map position of the CCP.

20. The method of claim 19, further comprising prioritizing, via the navigation system, the internal and external navigational data according to at least one of a source and/or type, wherein the linearized representation only includes navigational paths meeting a priority criteria.

* * * * *